(12) United States Patent
Townsend et al.

(10) Patent No.: US 8,572,650 B2
(45) Date of Patent: Oct. 29, 2013

(54) RECEIVERS FOR TELEVISION SIGNALS

(75) Inventors: Christopher Townsend, Middlesex (GB); David Holliday, Middlesex (GB); Robin Crossley, Middlesex (GB); Alun David Webber, Middlesex (GB); Nicholas James, Middlesex (GB)

(73) Assignee: British Sky Broadcasting Limited, Isleworth, Middlesex (GB)

( * ) Notice: Subject to any disclaimer, the term of this patent is extended or adjusted under 35 U.S.C. 154(b) by 215 days.

(21) Appl. No.: 12/140,949

(22) Filed: Jun. 17, 2008

(65) Prior Publication Data
US 2009/0049483 A1   Feb. 19, 2009

Related U.S. Application Data

(60) Continuation of application No. 10/234,472, filed on Sep. 5, 2002, now Pat. No. 7,389,253, which is a division of application No. 09/091,510, filed as application No. PCT/GB96/02856 on Nov. 19, 1996, now abandoned.

(30) Foreign Application Priority Data

Dec. 22, 1995 (GB) .................................. 9526304.2
Aug. 5, 1996 (GB) .................................. 9616406.6

(51) Int. Cl.
*G06F 3/00* (2006.01)
(52) U.S. Cl.
USPC .................................. 725/41; 725/43; 725/40
(58) Field of Classification Search
None
See application file for complete search history.

(56) References Cited

U.S. PATENT DOCUMENTS 4,977,455 A   12/1990   Young
4,992,940 A   2/1991   Dworkin
5,319,454 A   6/1994   Schutte
(Continued)

FOREIGN PATENT DOCUMENTS

EP   0 562 295 A1   9/1993
WO   9414284 A1    6/1994
WO   9501058 A1    1/1995

OTHER PUBLICATIONS

"Interactive TV takes a step forward," Michael Krantz, Mediaweek, Apr. 11, 1994. Retrieved via ProQuest.

*Primary Examiner* — Brian Pendleton
*Assistant Examiner* — Jean D Saint Cyr
(74) *Attorney, Agent, or Firm* — Rothwell, Figg, Ernst & Manbeck PC

(57) ABSTRACT

A receiver for television signals is arranged to receive video signals comprising video data and information data. The receiver is arranged to respond to viewer operation of a control device. The receiver includes a processor for processing selected information data to convert the same into signals representative thereof for output to a television in combination with the video signals. The receiver is arranged to respond to the information data to output for display data derived from said image data and said information data and representing an inter-active image. The receiver is responsive to viewer manipulation of the control device to vary the interactive image and to establish a telecommunications link to a remote site for on-line interaction via the interactive image between the viewer and the remote site. The interactive image may form part of an interactive services interface comprising a broadcast entry level and plural broadcast interactive levels. The interactive services interface may comprise one or more on-line interactive levels entered from one of the broadcast interactive levels for establishing an on-line connection with a remote site.

17 Claims, 13 Drawing Sheets

(56) References Cited

U.S. PATENT DOCUMENTS

| | | |
|---|---|---|
| 5,488,412 A | 1/1996 | Majeti et al. |
| 5,510,808 A | 4/1996 | Cina, Jr. et al. |
| 5,559,550 A | 9/1996 | Mankovitz |
| 5,589,892 A | 12/1996 | Knee et al. |
| 5,590,197 A | 12/1996 | Chen et al. |
| 5,594,509 A | 1/1997 | Florin et al. |
| 5,600,364 A * | 2/1997 | Hendricks et al. ............ 725/9 |
| 5,606,374 A | 2/1997 | Bertram |
| 5,629,733 A * | 5/1997 | Youman et al. ............ 725/53 |
| 5,664,110 A | 9/1997 | Green et al. |
| 5,790,793 A | 8/1998 | Higley |
| 5,802,526 A | 9/1998 | Fawcett et al. |
| 5,818,441 A | 10/1998 | Throckmorton et al. |
| 5,880,769 A | 3/1999 | Nemirofsky et al. |
| 5,907,315 A | 5/1999 | Vlahos et al. |
| 6,005,561 A | 12/1999 | Hawkins et al. |
| 6,026,377 A | 2/2000 | Burke |
| 6,157,413 A | 12/2000 | Hanafee et al. |
| 6,182,052 B1 | 1/2001 | Fulton et al. |
| 6,239,794 B1 * | 5/2001 | Yuen et al. ............ 725/41 |
| 6,275,268 B1 | 8/2001 | Ellis et al. |
| 2008/0184321 A1 * | 7/2008 | Lemmons et al. ............ 725/100 |

\* cited by examiner

RECEIVERS FOR TELEVISION SIGNALS

CROSS-REFERENCE TO RELATED APPLICATION

This application is a continuation of U.S. patent application Ser. No. 10/234,472 filed 5 Sep. 2002, now U.S. Pat. No. 7,389,253, which in turn is a division of U.S. patent application Ser. No. 09/091,510, filed 17 Dec. 1998, which in turn is a 371 filing of international application No. PCT/GB96/02856, filed 19 Nov. 1996. Each application is incorporated herein by reference.

BACKGROUND OF THE INVENTION

1. Field of the Invention

The invention relates to improvements in receivers for television signals.

2. Description of the Related Art

At present most television broadcasting, regardless of medium over which the signal is broadcast (Terrestrial, Cable, Satellite), is analogue based and comprises a single television service (e.g. SKY ONE, SKY SPORTS, SKY MOVIES) transmitted on a carrier signal or channel. However, the use of digital based broadcast technology is imminent. Digital broadcast technology will enable television service companies to transmit in a single channel high definition television programs, or plural programs at conventional definition or multiple customer services, or a combination of these.

In a conventional analogue-based television broadcast system programs (or "services") are broadcast by separate television service companies on a single carrier signal ("channel"). In a digital based broadcast system it is possible to broadcast plural services multiplexed together on a single carrier. Unless the context requires otherwise the term "channel" will be used herein to refer to the bandwidth used by a single service to broadcast television programs or other customer services. The term "channel" therefore encompasses both an entire carrier signal (when the signal is used entirely by a single service) and a portion of a carrier signal (when the signal is shared by plural services).

The ability to transmit multiple channels in a single carrier signal enables a far greater number of services to be provided in the digital domain than is possible in the analogue domain. Some of the channels in a carrier may be used to provide conventional television programs while simultaneously other channels in the carrier are used to provide data for other customer services such as television program listings, on-line program ordering or so-called pay-per-view (PPV) services, and so on. Customer services should not be confused with the "services" provided by television companies as discussed hereinabove.

In addition to such television related services some of the channels in a carrier may be used to provide on-line shopping facilities by which a customer may purchase goods and/or services from their own home. Such on-line shopping is, of course, only possible if there is an element of interaction between the goods/service provider and the customer. The term "interactive services" will be used herein to refer generally to on-line shopping facilities and the like made available via one or more channels in a digital based broadcast system.

Digital data compression techniques enable a single channel to carry simultaneously multiple interactive services. In itself this creates a problem. Many customers will find bewildering the large number of interactive services available to them. If customers become confused they will not make use of the interactive services. Clearly, this is undesirable.

Transmission bandwidth is a finite resource and will remain at a premium even if full advantage is taken of digital data compression techniques. This presents a problem when it comes to providing an interactive service. On the one hand it is desirable to present high quality pictures and graphics. However, higher quality necessitates the use of a larger bandwidth. On the other hand it is desirable to keep costs down because customers will not make use of interactive services if they are significantly more expensive than comparable high street services.

The invention aims to address the above-mentioned and other problems.

In one aspect the invention provides a receiver for receiving broadcast digital television signals representing both image data and information data, the receiver being responsive to the information data to output for display data derived from said image data and said information data and representing an interactive image, and being responsive to viewer manipulation of an input device to vary the interactive image and to establish a telecommunications link to a remote site for on-line interaction via the interactive image between the viewer and the remote site.

In another aspect the invention provides a method of interacting with broadcast interactive services, the method comprising receiving signals representing both image data and information data, deriving from the data in the received signals an interactive image for display, responding to manipulation of an input device by varying the interactive image, and establishing a telecommunications link to a remote site for on-line transfer of data therewith in response to the manipulation of the input device.

In a further aspect the invention provides an interactive services interface comprising: a broadcast entry level for enabling a user to select from a range of available service types; a first broadcast interactive level entered by user selection of a service type in the entry level for enabling the user to select from a group of service providers of the selected type; a second broadcast interactive level entered by user selection of a service provider in the first broadcast interactive level, for enabling the user to select from a range of classes of goods and/or services available from the selected service provider: and a third broadcast interactive level, entered by user selection of a class of goods and/or services, for enabling the user to select goods and/or services from the selected class.

In another aspect the invention provides a receiver for receiving television signals in a plurality of channels, each signal comprising video data defining a television program and program scheduling data defining the scheduling of programs in the plurality of channels, the receiver being arranged to produce from received program scheduling data output signals defining for display an image of a list of present programs in the plurality of channels, the receiver comprising a user operable selector operable to select from the list when displayed one of the present programs and being responsive to such selection by receiving the video data for the selected present program and combining the video data with the output signals so that the output signals define an image of the selected present program in combination with the image of the list of the present programs.

In another aspect the invention provides a receiver for receiving television signals in a plurality of channels each defining a television program, the receiver comprising a processor adapted to generate output signals for display of an image representing a list of programs receivable by the receiver; the receiver comprising a user operable selector operable to select from the list when displayed channels for which no information will normally be displayable by the receiver.

In another aspect the invention provides a receiver for receiving television signals in a plurality of channels each defining a television program, the receiver comprising a processor adapted to generate output signals for display of an image representing an ordered list of channels receivable by the receiver, the receiver comprising a user operable selector operable to select the order in which channels are listed in the list.

The above and further features of the invention are set forth with particularity in the appended claims and together with advantages thereof will become clearer from consideration of the following detailed description of an exemplary embodiment of the invention given with reference to the accompanying drawings.

DETAILED DESCRIPTION OF AN EMBODIMENT OF THE INVENTION SYSTEM OVERVIEW

Figure 1:
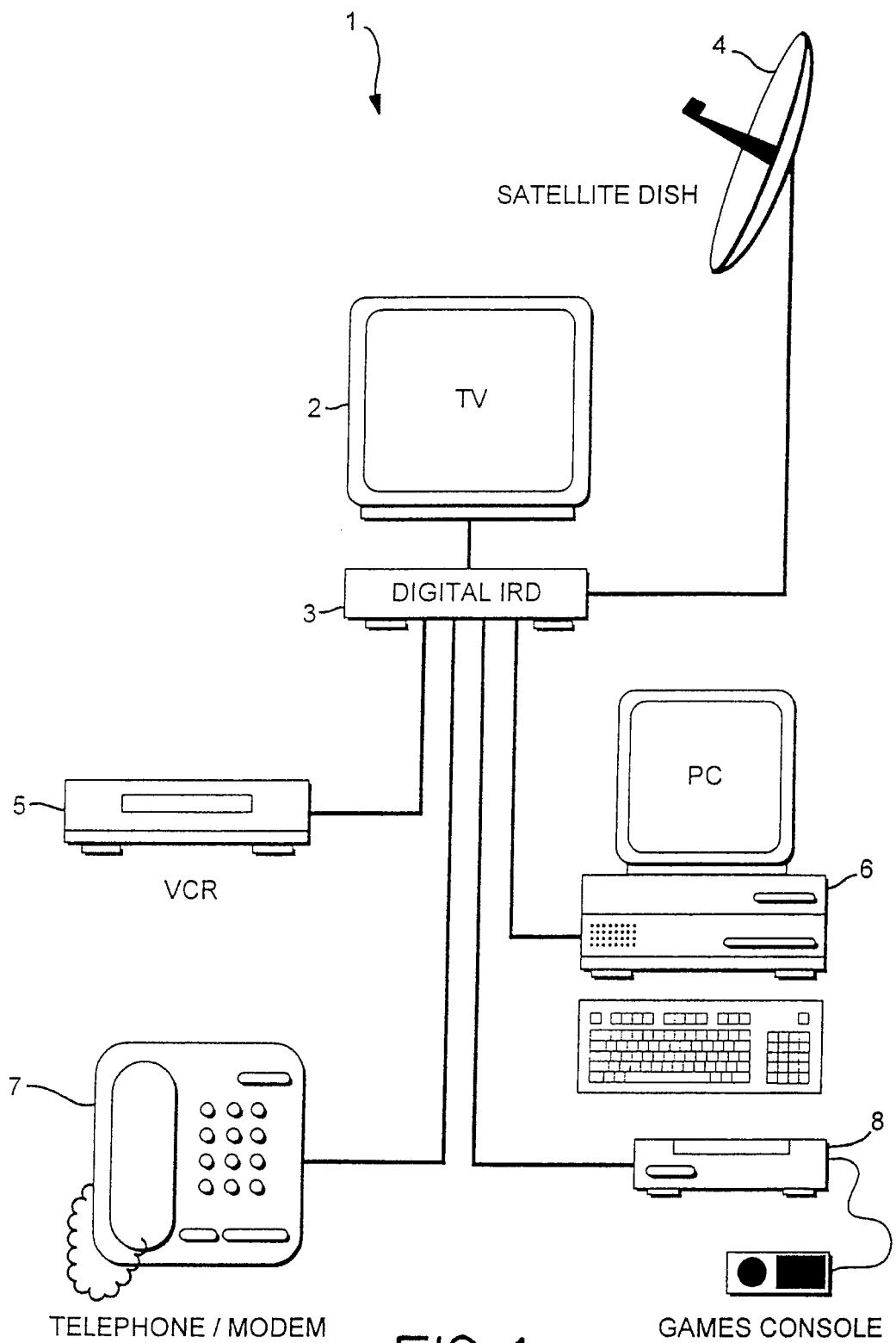
FIG. 1 is a schematic diagram of a television receiver system.

Referring now to FIG. 1 of the accompanying drawings a television receiver system 1 comprises a television (TV) 2, a digital integrated receiver decoder 3 (decoder) connected to receive signals from a satellite dish antenna 4, and a video cassette recorder 5 (VCR), and a modem 7. The system 1 optionally further comprises a personal computer 6 (PC) and a games console 8 each connected via respective lines to the decoder 3. SCART connectors or other standard connectors may be used as appropriate. The decoder 3 acts as an interface between the TV 2 and the VCR 5, PC 6, modem 7 and games console 8 and thus serves to control the system 1.

Receiver/Decoder

Figure 2:
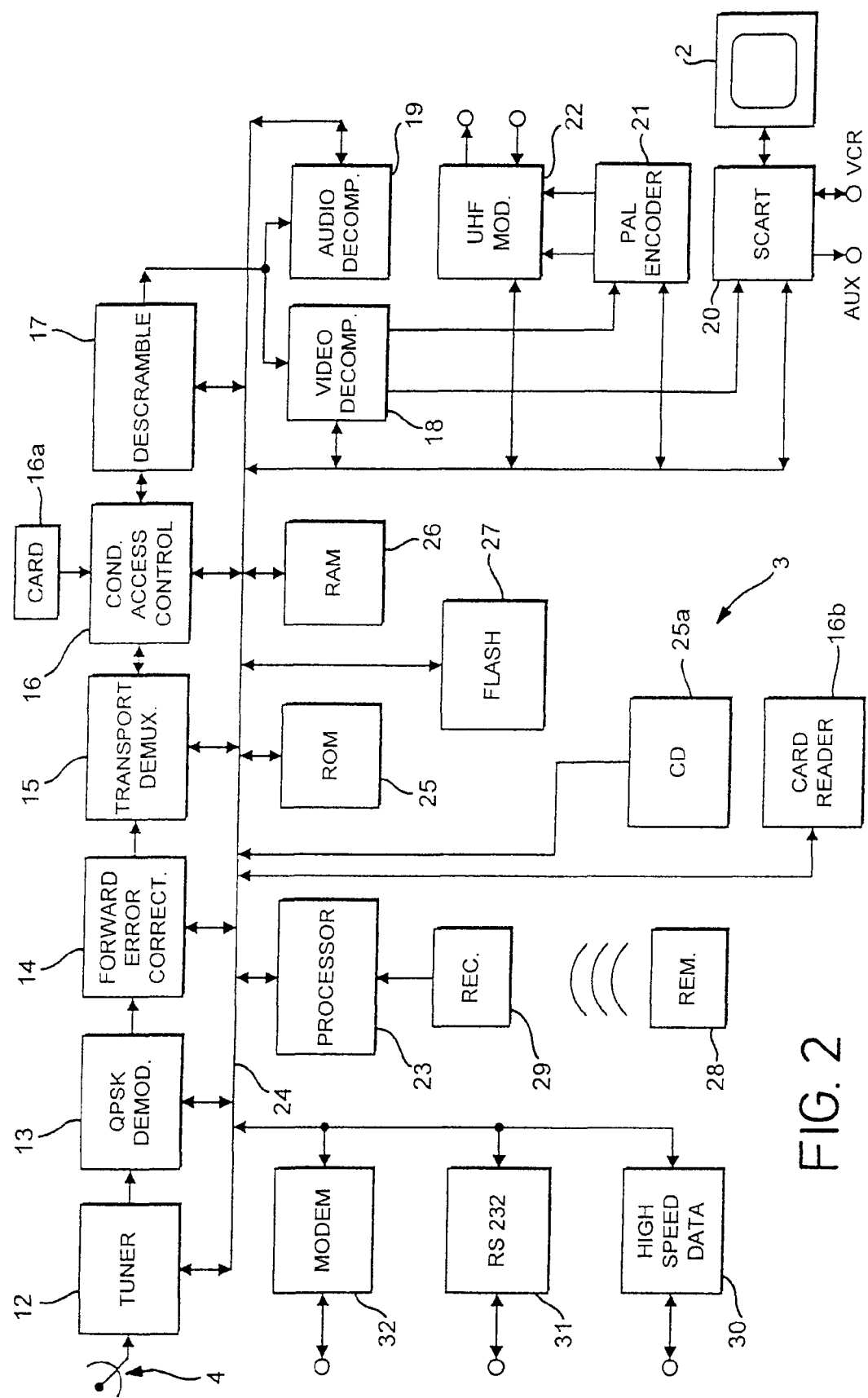
FIG. 2 is a functional block diagram of a satellite decoder.

FIG. 2 of the accompanying drawings shows the decoder 3 in greater detail. The dish antenna receives signals from a satellite (not shown), Signals from the dish antenna 4 are input to a tuner 12 and from there to a quadrature phase shift key (QPSK) demodulator 13. Demodulated signals are error corrected by way of a forward error corrector circuit 14. Data from the forward error corrector circuit is supplied to a transport/demultiplexer 15 which separates the data into video data, audio data, and user services data program (scheduling data, etc. for distribution to various locations within the decoder. Satellite (and indeed cable) programs are usually scrambled to prevent unauthorized access by non-authorized subscribers. The decoder 3 therefore comprises a conditional access control circuit 16 which cooperates with a smart card 16a to determine whether the viewer has subscribed to a particular channel and is therefore authorized to access the channel. Parental control over channel access is also provided, at least in part, by the access control circuit 16. The decoder 3 further comprises a descrambling circuit 17 which is controlled by the access control circuit 16 to enable the descrambling of the signal by authorized subscribers.

The received signals comprise digitally encoded data. It is envisaged that the data will be compressed using for example the DVB/MPEG 2 standards which permit both program data and additional data (for example interactive service data) to be transmitted in a single channel. DVB/MPEG 2 enables high compression ratios to be achieved.

Descrambled signals from the descrambling circuit 17 are input to a video decompression and processing circuit 18 and an audio decompression and processing circuit 19, operating according to the MPEG standard for example. Decompressed video signals are input to a SCART interface 20 for direct input to the TV 2 and to a PAL encoder 21 where they are encoded into the PAL format for modulation by a UHF modulator 22 for output to the UHF input of the TV if so desired.

The system 3 is controlled by a processor 23 which communicates with the various units of the system via a bus 24. The processor 23 has associated with it ROM 25 (optionally including a CD-ROM drive 25a), RAM 26 (comprising both dynamic RAM and static RAM) and a flash (non-volatile and writable) memory 27. As will be explained in greater detail hereinafter the processor 23 controls operation of the decoder 3 by controlling the tuner 12 to receive signals for the desired channel from the dish antenna 4 and to control demultiplexing, descrambling and decompression so that the desired program and/or interactive service data is displayed on the screen of the TV 2. Viewer selection of desired programs and customer services is controlled by way of a remote control unit 28 which in response to viewer manipulation thereof transmits control signals to a receiver 29 for input to the processor 23.

The system 3 further comprises a high-speed data interface 30 and an RS232 interface 31 providing a serial link. The high-speed data interface 30 and the RS232 interface may be connected to the PC 6 and/or the games console 8 of FIG. 1 and/or other digital equipment (not shown). The high speed data interface 30 enables the system 3 to be connected to other devices (not shown) for example to enable reception of services transmitted via other media such as broadband cable and digital terrestrial broadcast. The decoder 3 further comprises a modem interface 32 for connecting to a telephone network.

Figure 3:
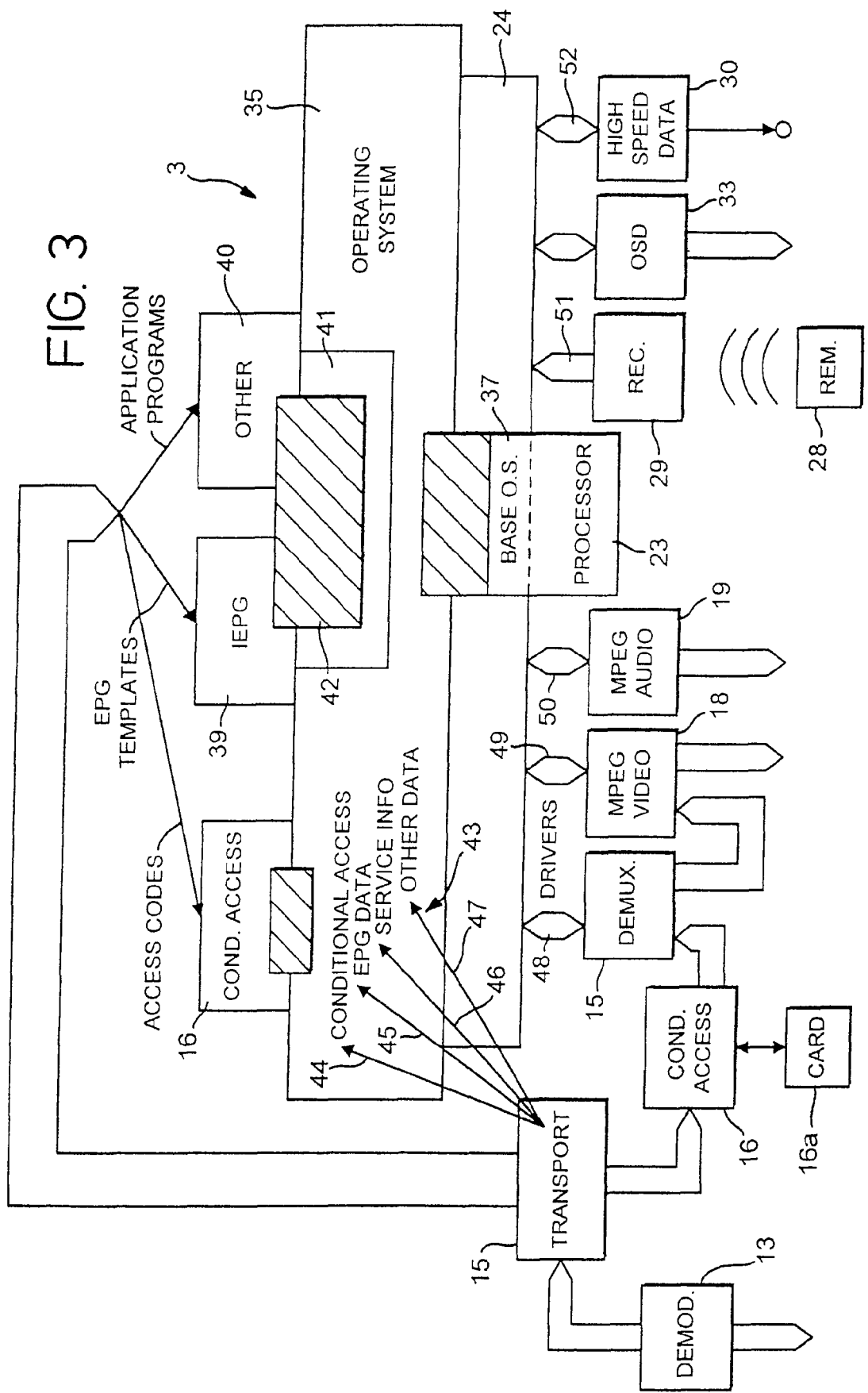
FIG. 3 is a functional diagram showing interaction between hardware and software of the decoder of FIG. 2.

Operation of the decoder 3, especially the processor 23, is controlled by software that makes the processor 23 responsive to control signals from the remote control unit 28 and to data included in the signal received by the dish antenna 4 and in the memory units 25 to 27. A schematic representation of the interaction between hardware and software in the decoder 3 is shown in FIG. 3 of the accompanying drawings. The data in an incoming signal is separated by the transport/demultiplexer 15 into video data and information data. The information data is distributed around the hardware and software, as will be described in greater detail hereinafter. The video data and the audio data is demultiplexed and output in suitable form for supply to a TV by the MPEG video and audio circuits 18 and 19. When information is to be displayed either with or instead of the video, data representing the information is output in suitable form for supply to the TV via an on-screen display (OSD) driver 33 and the video circuit 18. Signals from the OSD driver 33 and the video circuit 18 are combined as appropriate before being supplied to the TV 0 Operation of the software and hardware of the decoder 3 is based around an operating system 35. The conditional access controller 16 has associated software which interfaces with the operating system. The processor 23 has its own base operating system 37 which interfaces to the decoder operating system 35. Applications such as an intelligent electronic program guide (IESG) 39 and other applications 40 including interactive services interface to the operating system 35 via an applications interface 41 and associated application translator 42.

The software for conditional access applications such as the intelligent electronic program guide 39 are installed permanently within non-volatile memory, e.g. the ROM 25, of the decoder 3, but variable information such as new access codes and TV program scheduling details is updated regularly via signals received from the dish antenna 40. Demodulated signals from the demodulator 13 are input to the transport demultiplexer 15 which examines the data to decide-where it should be sent. From time to time significant changes may be made to conditional access codes or to the manner in which the intelligent electronic program guide (IESG) 39 displays program information. Also, programs for additional applications, say an interactive shopping or banking service for example, are also supplied via the satellite for the decoder. Such application data is routed by the transporter 15 directly to the appropriate areas 40 of the store.

Operating data 43 is supplied on a substantially continuous basis in every channel. The operating data 43 includes conditional access data 44 associated with a channel and/or programs therein which enables the conditional access controller 16 to determine whether or not access should be allowed to a particular program by descrambling the data therefor. Additionally, operating data relating to interactive services is transmitted in dedicated interactive service channels which carry control and information data for use by the hardware and software of the processor 23 and the associated (memory devices 25 to 27. Thus, the operating data 43 depicted in FIG. 3 also includes interactive service programs and information 46 (for example relating to personal banking services) and indeed any other data 47 required on a substantially continuous or regular basis for the aforementioned interactive services.

The transport/demultiplexer 15 is arranged to supply the operating data 43 to the processor 23. The data is acted upon by the operating system 35, the conditional access and/or other operating software. The processor 23 responds to the data by sending appropriate commands or information to other units within the system. Control data is also transferred between the processor 23 and such units as the demultiplexer 15, the video and audio decompressors 18, 19, 20 the remote control receiver 29 and the high-speed data interface 30 via respective drivers 48 to 52.

The combined hardware and software of the decoder 3 enables the data in received channels to be decoded for display of viewer selected programs and customer services. The scrambling is controlled on a continuous basis and the decoder can be updated with new descrambling codes as and when required. Data for interactive services is supplied and updated substantially continuously and programs relating to newly selected interactive services are downloaded into the decoder.

Operation of the decoder 3 in receiving and decoding data representing television programs and data defining scheduling and other information related to the programs is described in detail in our International Patent Application No. PCT/GB96/01228, the teachings of which are incorporated herein by reference. Operation of the decoder 3 in providing interactive services will be described in the following.

Interactive Services

Figure 4:
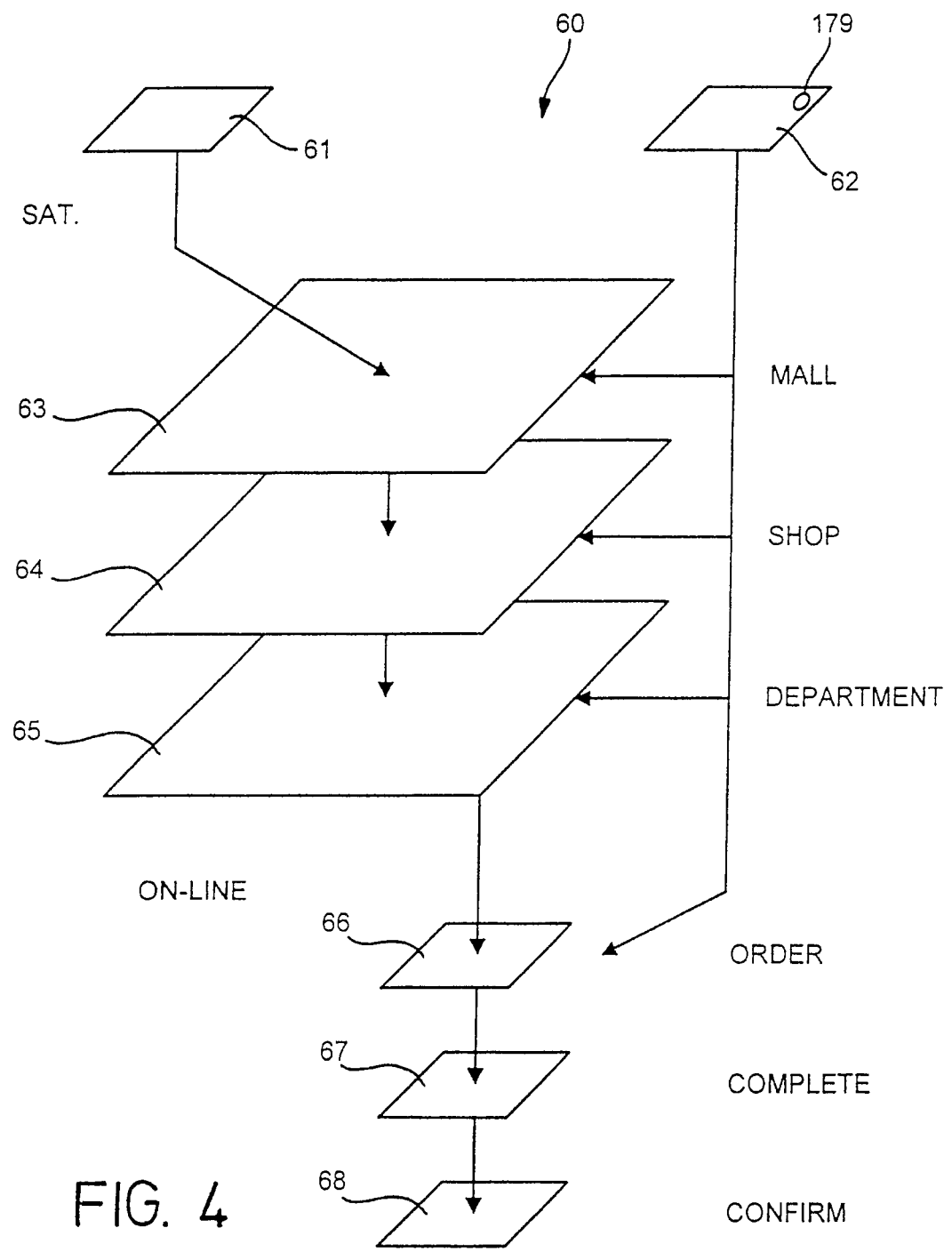
FIG. 4 is a schematic diagram of an interactive services interface structure.

The interactive services is hierarchical and interfaces with the viewer as (shown in FIG. 4 of the accompanying drawings. The structure of the interactive interface 60 represents the order in which information is presented to the viewer and comprises an entry level containing two different entry screens 61, 62 and several different interactive levels 63 to 68. Usually entry into the interactive services will be initiated by the viewer manipulating an "interactive services" key (not shown) on the remote control unit 28 (see FIG. 2). The processor 23 is arranged to respond to such manipulation by causing a menu of options to be displayed on the screen of the TV 2. Data defining the menu is stored within the memory devices 25 to 27 of the decoder, with data defining the form of the menu (i.e. a menu template) being stored semi-permanently (e.g. in non-volatile memory). In a broadcast system, such as satellite broadcast, it is possible to construct the decoder 3 to receive data defining new templates over the broadcast medium so that menus and the like can be updated by the broadcast company without the need for any interaction with the viewer. Data defining the legends appearing in the menu is stored separately to enable the legends also to be changed as and when desired by the broadcast company without affecting the form of the menu.

Figure 5:
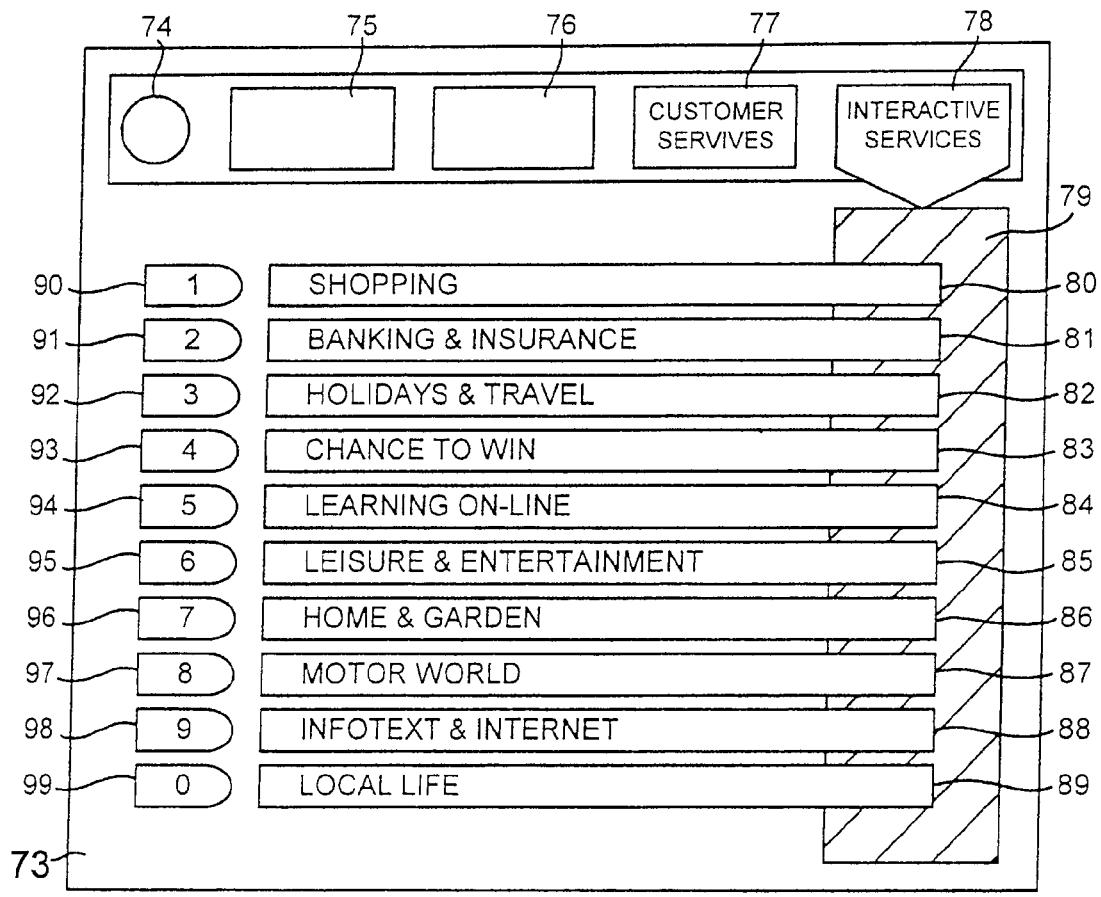
FIG. 5 is a diagram of a menu screen.

The menu of options is shown at 73 in FIG. 5 of the accompanying drawings and corresponds to the entry screen 61 in FIG. 4. Referring to FIG. 5 the menu 73 comprises an option bar 74 extending across a top portion of the screen and containing an icon for each of the options "TV Guide" 75, "Box Office" 76. "Customer Services" 77, and "Interactive Services" 78, available for selection by the viewer. The options "TV Guide", "Box Office" and "Customer Services" are described with particularity in our International Patent Application No. PCT/GB 96/01228. As shown in FIG. 5 the interactive service option has been selected and the "Interactive Services" icon 78 is highlighted with a bus bar 79 extending therefrom behind ten different legends 80 to 89 representing services available via the decoder. Icons 75 to 77 appear faint to indicate that those options have not been selected.

A single template is used to define the menu for all of the options represented by the icons 75 to 78 so that regardless of which option is selected the look and feel of the menu will be the same. Of course, the legends vary between menus and therefore different legend data will be stored for each option menu. It is technical I:" possible to transmit the template and legend data for the menu 63 continuously via satellite, but it is preferable that the data is broadcast only occasionally and held in memory within the decoder 3 so that when selected the menu appears without any discernable delay on the screen of the TV 2.

The legends 80 to 89 will, of course, depend on what interactive services are available to the viewer. The legends 80 to 89 shown in FIG. 4 are representative of a broad cross-section of services that may be made available to a viewer and include on-line shopping and financial services, entertainment, education, information and communication. Other categories of service could naturally be provided if so desired.

A service is chosen by manipulating a numbered key on the remote control unit 28 corresponding to one of the numbered pointers 90 to 99 next to the legends 80 to 89. The processor 23 responds to such manipulation of a numbered key as a command to select the service corresponding to that number. Alternatively, manipulating "up" and "down" keys on the remote control unit will result in the processor causing each of the legends 80 to 89 and respective pointers 90 to 99 to be highlighted in turn on the TV screen (e.g. legend 81 and pointer 91). Manipulating a "select" key on the remote control unit 28 is interpreted by the processor 23 as a command to select the service corresponding to the highlighted legend.

Figure 6:
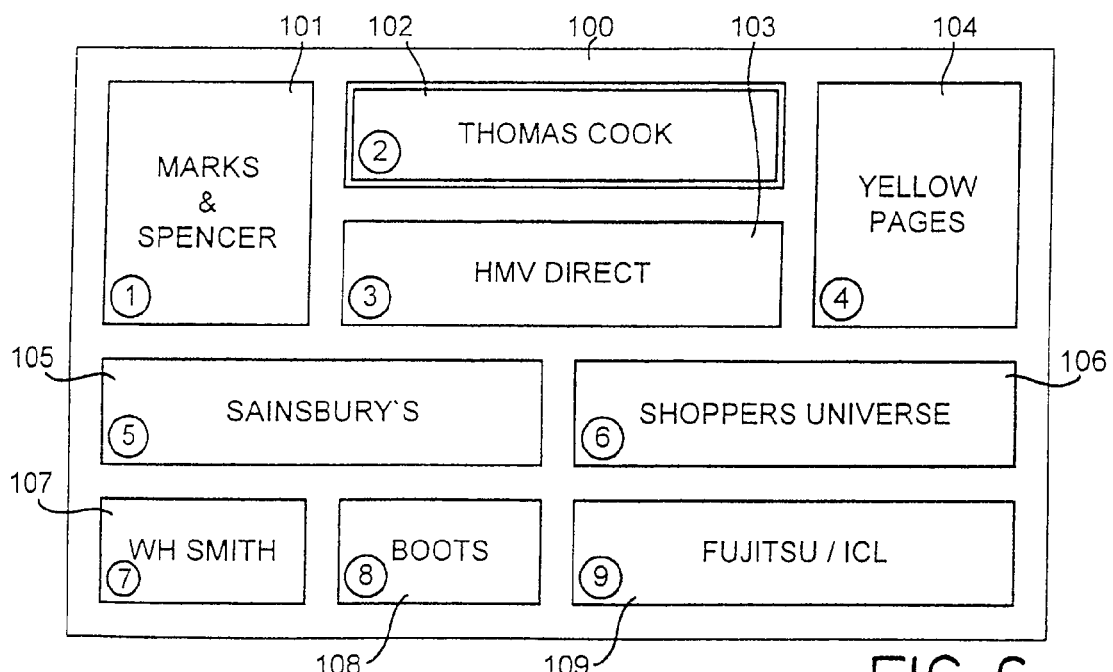
FIG. 6 is a diagram of a screen representing service providers offering interactive services.

When a service is selected the processor 23 responds by moving into the first interactive level 63 which represents all service providers for the selected category of service, A screen representing some, if not all, of the service providers is displayed on the TV, FIG. 6 of the accompanying drawings shows an example of a screen 100 that is displayed if the "shopping" legend 81 is selected from the FIG. 5 menu, The screen 100 comprises nine icons 101 to 109 representing the trade marks and/or logos of "shops" offering an on-line shopping service, Template data defining the layout of the icons and logo data defining the logos appearing in the icons is normally transmitted continuously via satellite to be received when required by the decoder, Of course, if sufficient memory were made available within the decoder 3 the data could be held within the decoder and simply updated from time to time when changes occur, The company names shown in FIG. 6 are exemplary only and should not be taken as indicating any preference or allegiance between those companies and the applicants/assignees of the present invention.

The layout of the screen 100 can be likened to the layout of shops in a shopping mall. Manipulation of keys on the remote control unit enables the viewer to visit each "shop" in turn should he so wish. Each "shop" has a number displayed in the icon 101 to 109 enabling a shop to be "visited" by manipulation of the corresponding numbered key on the remote control unit 28. When a "shop" is selected by manipulation of the keys on the remote control unit 28 the processor 23 responds by moving into the next, i.e. second interactive level 64 (see FIG. 4) where information specific to the selected "shop" is displayed. In FIG. 6 the Thomas Cook icon 102 is highlighted and so for the purpose of explanation it will be assumed that the Thomas Cook shop is entered by the viewer.

Figure 7:
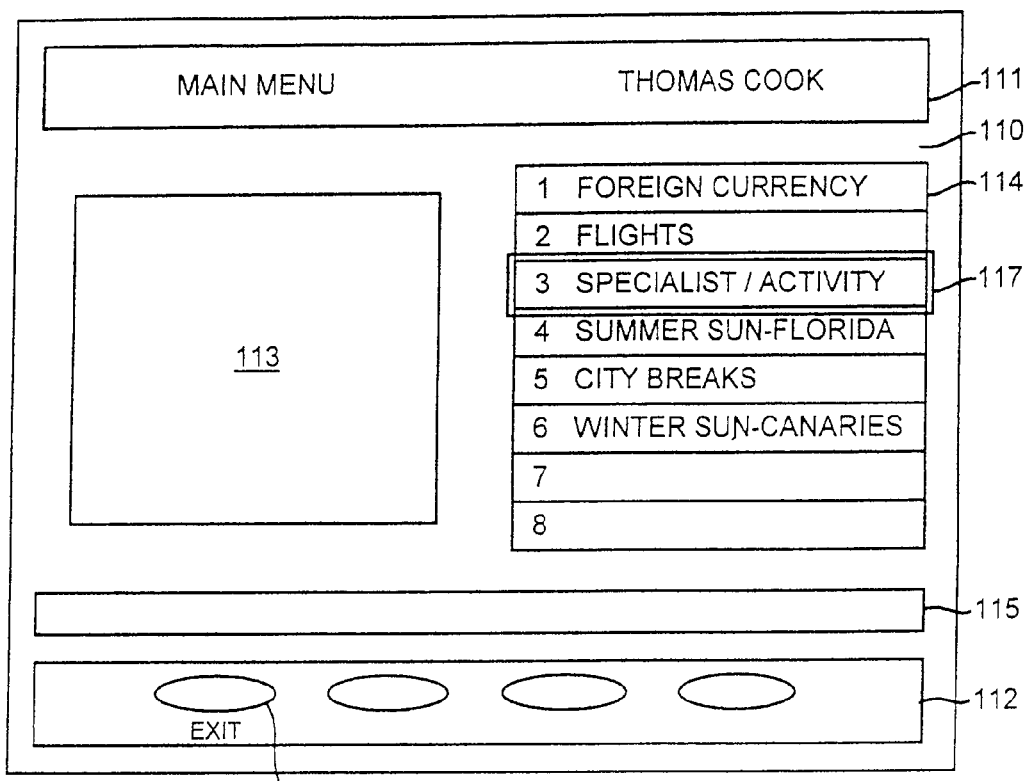
FIG. 7 is a representation of a main menu screen of a service provider.

Thus, on entry into the "shop" (by manipulation of the remote control keys) the processor 23 causes the screen to change to the screen 110 shown in FIG. 7 of the accompanying drawings. It should be noted that the screen 110 corresponds to the second interactive level 64 shown in FIG. 4. Continuing the shopping mall analogy entering the screen 110 is equivalent to entering a shop in the mall. The screen 110 is transmitted continuously in a dedicated channel or channel portion and when the "shop" is selected the processor 23 causes the decoder 3 to receive the decoded data from the appropriate channel.

Since all screens are defined by only a few templates the feel of each shop screen will be similar insofar as the layout of the screen is concerned. However, within the confines of the template each service provider is free to adapt the appearance of the screen to its own needs.

In the case of the screen 110 the template requires a main title bar 111 to be displayed in an upper portion of the screen, a tool bar 112 to be displayed in a lower portion of the screen, a picture 113 and option legends 114 to be displayed in a central portion of the screen, and a second title bar 115 to be displayed between the central and lower portions of the screen. In the case of screen 110 the main title bar 111 identifies the screen as the main menu of Thomas Cook, the second title bar 115 is blank, and the tool bar 112 contains only an "exit" button 116, which enables the viewer to return to the shopping mall screen 100 shown in FIG. 6.

Depending on the wishes of the service provider and its budget to pay for bandwidth, the picture 113 may be still or moving video. Even though compression techniques are used to compress image signals to say ⅛ or 1/16 screen size and the decoder is arranged to decompress the signals to produce a ¼ screen size image, still pictures require less bandwidth, and are therefore less expensive, than moving videos. An audio track containing narrative, music, sound effects or a mix of all three may also be transmitted for play when the screen 110 is displayed. Where video is shown in the picture portion the audio and video may be synchronized. If the service provider is currently or has recently advertised on television, it may choose to run the advert as video in the central portion of the screen 110.

The legends 114 enable the viewer to select from a range of options by manipulating keys on the remote control unit in a manner similar to that already described hereinabove with reference to FIGS. 5 and 6 of the drawings. For the purpose of explanation it will be assumed that the option 117 10 "Specialist/Activity Holidays" has been selected by the viewer. The processor 23 responds to this selection by causing the screen 120 showl1 in FIG. 8 of the accompanying drawings to be displayed. The screen 120 corresponds to the third interactive level 65 shown in FIG. 4 of the drawing so In the shopping mall analogy entering the screen 120 is equivalent to visiting a Specialist/Activities Holidays consultant in a Thomas Cook shop. In a department store it would be equivalent to entering a department within the store. Data defining the screen 120 and any associated audio are also transmitted continuously in a dedicated channel from the satellite.

It will be noted that the form of the screen 120 is similar to that of the screen 110 insofar as the screen 120 comprises a main title bar 121, a tool bar 122, a picture 123, option legends 124 and a second title bar 125. However, it will also be noted that the information in the screens 110 and 120 is entirely different and that the layout of the legends 114 and 124 in the central portions of the two screens 110 and 120 is not the same.

In the screen 120 the displayed picture 123 depends on which of the option legends 124 has been selected. For example if the 'golf' option 126 is selected a video of a golfing resort may be shown, but if the "cruise" option 127 is selected a sequence of still pictures of a cruise liner may instead be shown. The content of each screen will naturally depend upon the wishes of the service provider and, within the constraints of the predetermined templates, can be varied as desired. Indeed, the choice of which screens to use and in which order is with the service provider who may for example decide to use the screen 120 as the main menu and the screen 120 for more specific services.

It is possible for a service provider to choose a mix of videos and stills in order to achieve the most cost-effective portrayal of its goods or services. It is worth mentioning that videos and sequences of stills can be transmitted either continuously or in a continuous loop. In the case of a continuous video loop the viewer will enter the loop at random. The loop can be as long as the service provider wishes but will normally be no more than only one or two minutes in length. It is envisaged that the videos and still pictures will be provided for viewer entertainment and there tore entering a video half way through the loop will not have any detrimental effect. Indeed an entertaining video may encourage a viewer to stay and buy products and services, and wait for the video to run from beginning to end rather than just exiting from the screen. Should the service provider consider it important that a video loop is only seen from the beginning a suitable command can be transmitted with the video to wait until the start of the loop before outputting the video (and accompanying audio).

The tool bar 122 contains three active colored icons 128 to 130 each having a descriptive legend displayed therewith and one inactive colored icon 131. The colors of the icons 128 to 131 correspond to the colors of four colored keys (not shown) on the remote control unit 28. Manipulating a colored key on the remote control unit causes the processor 23 to effect the function indicated in the tool bar for that color. Thus, manipulating the key with the color corresponding to that of the icon 129 causes the processor to enter a purchase holiday routine.

Instructing code for the purchase holiday routine is transmitted at a convenient time to the decoder. The code may be transmitted as part of an initial download of data in the channel containing the main menu of the service provider, in which case it will be transmitted with data for other routines that may be utilized during viewer interaction with the services of the service provider. Also, the code may be transmitted with the data for screen 120, the code and the data being separated for storage in respective store areas by the transport/demultiplexer 15 (see FIGS. 2 and 3). When the purchase icon 129 is selected the processor 23 responds by causing the modem 32 to establish a telecom connection with a predetermined number. The number is transmitted (with other data for the screen 120 and corresponds to the number at which the service providers computer is located. while the connection is being established the video. still picture or still picture sequence 123 continues to be displayed in order to entertain the viewer until the connection is made. Also, an icon 132 representing a modem is displayed. The icon 132 is displayed in one color and/or flashes while the connection is being made and is displayed in another color when the connection is established.

Establishing the modem connection places the viewer on-line with the service provider. Modem communication is much slower than the broadcasting of data and generally the modem is used to transfer data directly pertinent to a purchase or whenever a direct exchange of data (conversation) is necessary between the viewer and the service provider. Screen data of a general nature continues to be extracted from the satellite transmission for display. During on-line communication one or more screens corresponding to the levels 66 to 68 in FIG. 4 are displayed on the TV screen. The on-line screens may follow the same general format but will tend to be more specific to the purchase or purchases being made.

Figure 9:
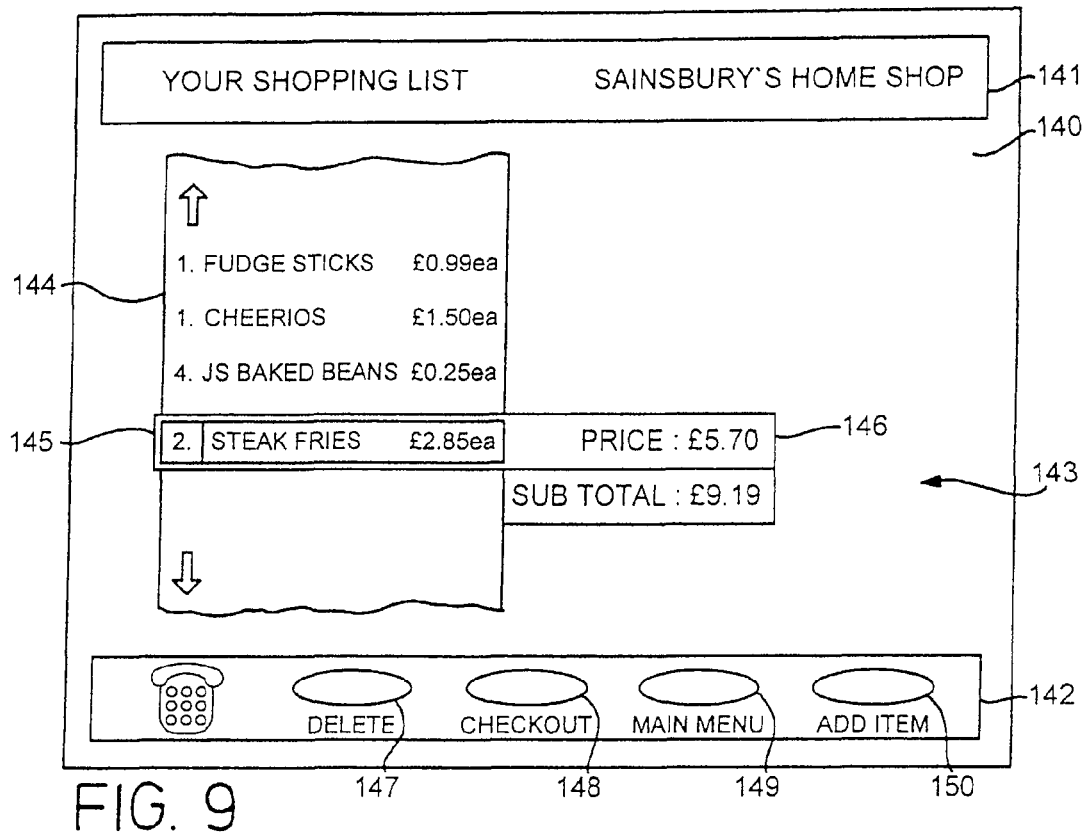
FIG. 9 is a diagram of another screen of a service provider.

FIG. 9 of the drawings shows an example of screen 140 for use in on-line purchasing from a supermarket company, e.g. J. Sainsbury PLC. As with previous screens, the screen 140 comprises a main title bar 141 and a tool bar 142, but the information in the central portion 143 of the screen is of the purchases being made by the viewer. The image in the central portion 143 is of a till receipt 144 containing entries corresponding to goods to be purchased by the viewer.

Data defining the image of the till receipt 144, the background of the central portion 143, the highlight 145 over a selected item and the price and subtotal boxes 146 is transmitted via satellite together with the title bar 141 and tool bar 142 data. Data corresponding to the goods is stored in memory when goods are selected in the previous screen. This data is originally transmitted via satellite or may be retrieved on-line via the modem depending on the service provider's setup. Data corresponding to the price of the selected goods is received via the modem from the service provider's computer and converted via the processor 23 into a suitable form for display on the screen 140. Price and subtotal data is calculated by the processor 23 in accordance with a program transmitted with the data defining the screen 140 via satellite. The colored icons 147 to 150 enable the user to control the processor 23 to move between different screens, thereby enabling the user to move up to the previous screen (corresponding to the level 65 in FIG. 4) to select further goods for purchase, and to move on to the next screen (corresponding to the level 67 in FIG. 4) to complete the purchase. Programs relating to each colored icon 147 to 150 are, of course, also transmitted via satellite.

Figure 10:
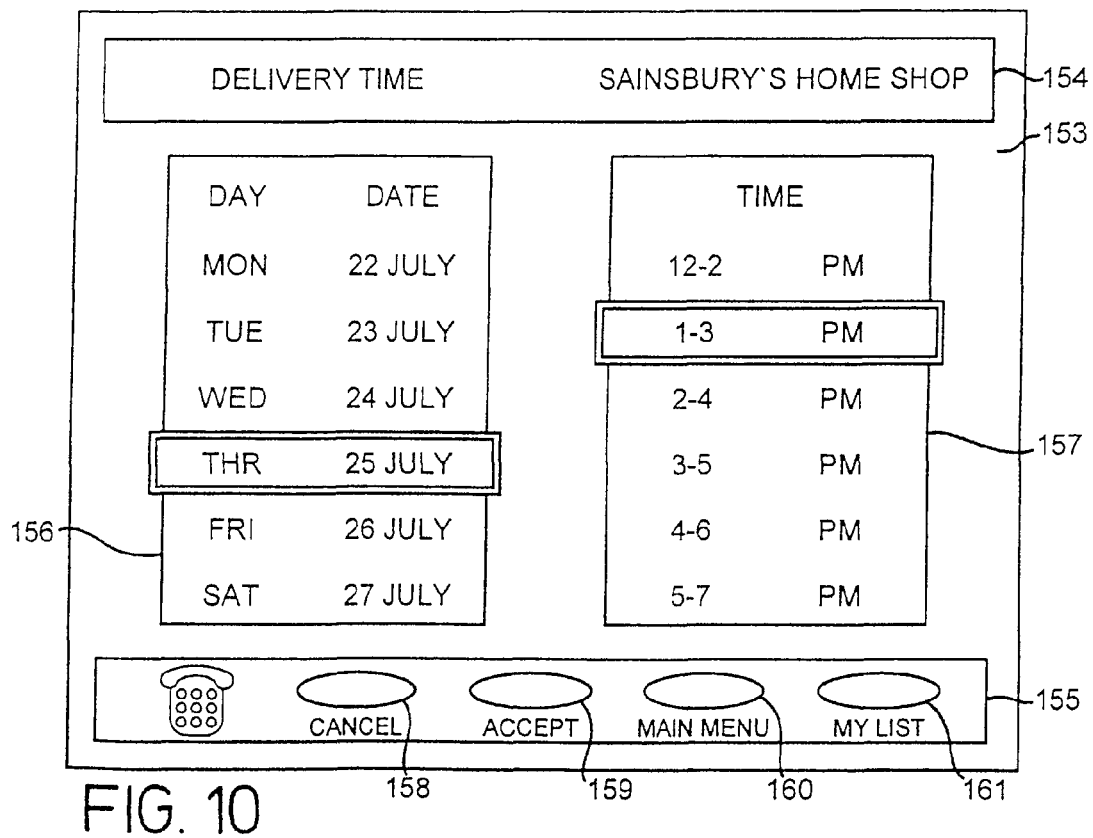
FIG. 10 is a diagram of an on-line screen of a service provider.

Selecting the "checkout" icon 148 causes the processor 23 to change the TV display to the screen 153 shown in FIG. 10 of the drawings. The screen 153 corresponds to the level 67 in FIG. 4. As with previous screens, the screen 153 comprises a main title bar 154 and a tool bar 155. The central portion comprises a list 156 of days and dates and a list 157 of delivery times. Manipulation of keys on the remote control unit enables the user to specify a day, data and time for delivery. As with the screen 140 in FIG. 9, most of the data for the screen 153 is received via satellite, with just data pertinent to the transaction being received/transmitted via the modem.

The tool bar 155 contains "cancel" and "accept" icons 158. 159. The viewer is therefore free to cancel his order at any time, the order only being placed when the "accept" icon 159 is selected. The tool bar 155 also contains a "main menu" icon 160. This icon will be included in most screens to enable the viewer to return to the main "shop" screen corresponding to the level 64 in FIG. 4, e.g. the Thomas Cook screen 110 shown in FIG. 7.

The tool bar 155 also contains a "my list" icon 161. It has been determined that for a typical household 80% of the weekly purchase remains the same between one week and the next. It is envisaged that supermarket companies will keep a record of each viewers previous purchase which can be called up on-line next time the viewer uses the on-line shopping service. This will simplify the viewer's weekly on-line shopping.

When the accept icon 159 is selected the processor 23 responds by causing a continuation screen (not shown) corresponding to the level 68 in FIG. 4 to be displayed on the TV screen. The confirmation screen is of a similar format to that of other screens and contains data from the service provider's computer continuing the order, price and time of delivery and identifying a reference number to enable the order to be identified in the event of a query.

Security is of great importance in any form of interactive services. The system so far described is inherently secure because the decoder 3 contains a subscription smart card 16*a* unique to the subscriber's household. The smart card 16*a* includes data identifying the household therefore enabling interactive services to be tailored automatically (as far as the viewer is concerned) to the viewers locality. Thus, for example, on-line supermarket shopping can be between the viewer and his nearest supermarket branch.

Security is provided by the use of personal identification numbers, so-called PIN numbers, which are known only to individual viewers in a household and are used to identify the individual viewers to a particular service provider.

In a given household there will normally be only one subscriber to television services, but most likely there will be more than one viewer. Individual PIN numbers can be assigned to several viewers in a household thus enabling each of the viewers to place on-line orders for goods and services without fear of other viewers in the household making on-line purchases in his name.

Figure 11:
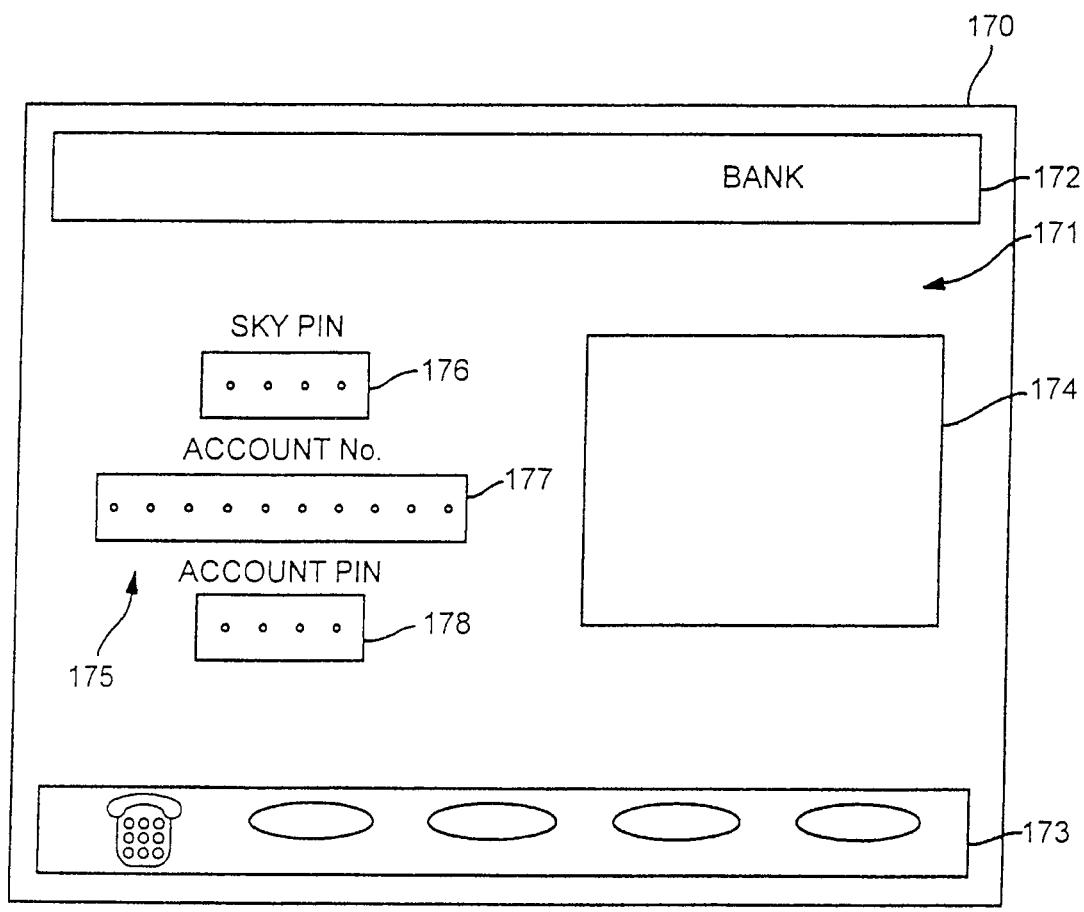
FIG. 11 is a diagram of another on-line screen.

Of course, banks and financial institutions have been making use of PIN numbers for security purposes for several years. FIG. 11 of the accompanying drawings shows an example of a screen 170 containing a main menu for a bank. A central portion 171 is defined between a main title bar 172 and a tool bar 173 and contains a region 174 for display of a picture and a region 175 in which various identity number boxes 176 to 178 are displayed. Normally, the screen 170 would be displayed once the viewer is ready to confirm his order and therefore corresponds to a level between levels 67 and 68 in FIG. 4. Naturally, the identity numbers can be requested at any convenient time in the interactive procedure.

In the screen 170 three identity numbers are requested. The first number is the viewer's PIN number for the television company. This first PIN number identifies the viewer as a specific person in a subscribing household as above-mentioned. The box 176 is first highlighted and then the viewer's PIN number is entered in the box 176 by manipulation of numbered keys on the remote control unit 28. The processor 23 responds to manipulation of a key by causing a non-numerical symbol, such as an asterisk, to be displayed in the box 176. The displaying of the symbol may be accompanied by an audible beep or other sound. All the viewers PIN numbers are stored within the memory of the decoder 3 or within the smart card 16a and the processor 23 is arranged to respond to an incorrect number being entered with suitable prompts. When all digits of the viewer's PIN number have been received, the processor 23 indicates acceptance of the first PIN number by highlighting the account number box 177.

Entry of the account number is by manipulation of the numbered keys on the remote control unit 28 to which the processor responds by causing the digits of the account number to be displayed in the box 177. Data representing the account number is transmitted to the bank's computer (not shown) via the modem and the bank's computer responds by transmitting back to the decoder 3 a command to request the PIN number for the account. The processor 23 responds to the command by causing the box 178 to be highlighted. The account PIN number is entered in a similar manner to the company PIN number with the entering of each digit being acknowledged by the displaying of non-numerical symbols in the box 178. Once the account PIN number has been so entered data representing the same is transmitted to the bank's computer (in encrypted form) which responds with a suitable command to the processor 23. If the PIN number is incorrect the command will be to display suitable prompts for the viewer to re-enter the number. If the PIN number is correct the command will be to proceed with the transaction and the processor will respond by moving onto the display of a verification screen corresponding to level 68 in FIG. 4.

It will, of course, be appreciated that the display shown in FIG. 11 is merely an example of the use of PIN numbers in relation to on-line banking services. In other circumstances, such as the purchase of goods from an on-line shopping service, PIN numbers may be used in conjunction with credit card numbers to effect payment for goods by way of a credit/debit card. In such circumstances the screen would be similar to that shown in FIG. 11 so as to maintain the same overall look and feel but with detail changes relevant to the specific transaction.

As shown in FIG. 2 the decoder 3 may include a second card reader 16b for reading a second card. Presently banks and other financial institutions are generally using magnetic strip cards as debit, credit and loyalty cards. The second card reader may therefore be suitable for reading magnetic strips. However, banks will shortly be moving over to "smart" cards because such cards offer greater security than conventional magnetic strip cards. The second card reader 16b may therefore be suitable for use with smart cards. A third possibility would be to use electronic cards which are "charged" with a case value and the cash value is reduced by the cost of the transaction each time the card is used. The second card reader 16b may be suitable for use with a cash card. Regardless of the type of card chosen the security is increased by the second card reader 16b because the viewer must present to the decoder the (company subscription card and the PIN number for that card. and the bank card and the PIN number for that card before a transaction will be allowed to proceed.

It was mentioned herein at the beginning of the description of FIG. 4 that there are two different screens 61 and 62 by which a viewer may enter the interactive services. The first entry screen 61 has been described hereinabove. The second screen 62 represents a screen that is displaced during normal broadcast of a program or an advertisement. During the broadcast an icon 179 is displayed over the picture inviting the viewer to enter the interactive services. For example, during a sports program sponsored by a brewery an icon may be displayed offering free beer, or during an advertisement for a car an icon may be displayed inviting the viewer to book a test drive.

Data representing the icon is transmitted together with a short program containing instructions as to how the processor 23 is to respond to viewer selection of the icon. The degree of interaction required with the viewer can vary considerably depending on the wishes of the service provider. For example, if free beer is being offered the only interaction required may be for the viewer to select the icon. In such a case the processor 23 would be arranged to respond to the selection by establishing a modem connection with a predetermined number and then transmitting to that number details of the viewer. If, on the other hand, the advertisement is for a car, the service provider may require the viewer to enter the interactive services at any of levels 63 to 65 as shown in FIG. 4 and interact with the displayed screens as already described herein.

Figure 12:
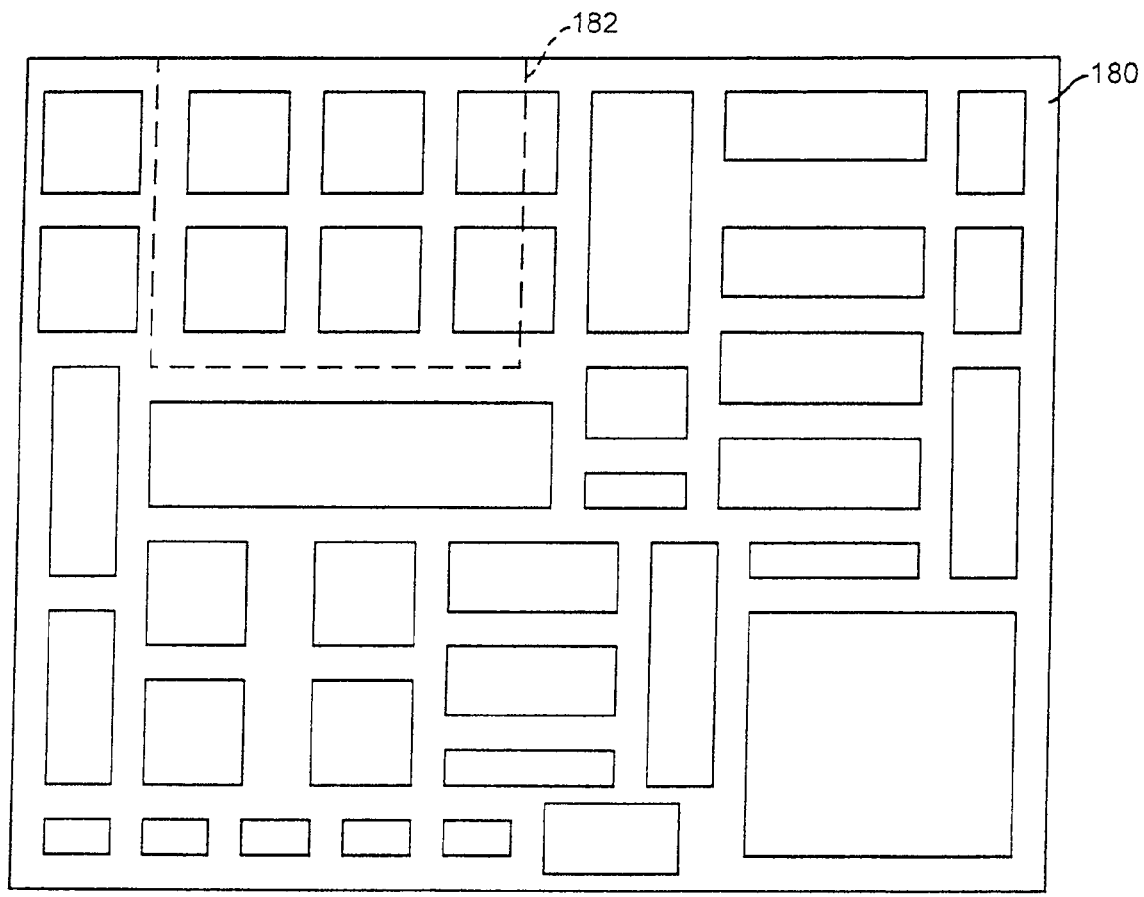
FIG. 12 is a diagram of an interactive level offering services from multiple service providers.
Figure 13:
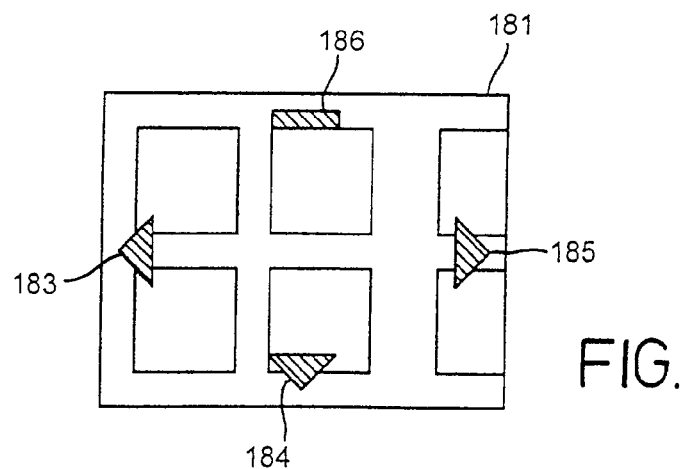
FIG. 13 is a diagram of a screen showing some of the multiple service providers of FIG. 12.

As the number of service providers grows it becomes more difficult to display all of the "shops" in the "shopping mall" on a single screen. Different screens may be displayed for different types of services. Alternatively, the screen may be arranged to display only a few of the "shops" in the "mall" at any given instant in time. FIG. 12 of the accompanying drawings shows a large "mall" 180 and FIG. 13 shows a screen 181 displaying only a few of the "shops" in a portion 182 of the "mall" 180. The screen 181 includes four markers 183 to 186 indicating the directions in which the "mall" extends. The arrows 183 to 185 indicate that the viewer can move to the left and right and down in the "mall" and the bar 186 indicates that the viewer cannot move up. Depending on the level of sophistication that is desired the processor 23 may be arranged either to scroll left and right, and up and down or to move stepwise in those directions. Scrolling is more sophisticated and requires greater processing power and, in order to keep down the cost of the decoder, stepwise movement is presently preferred.

It will be appreciated that the above-described interactive services are merely exemplary and that many other services can, of course, be made available within the described structure. In addition to on-line "shopping" at local or national outlets, local information and other locality-based services may be provided via the combined satellite and modem media. Also, traditionally local services such as job placement can be made national or even international via the combined media. Furthermore, it will be possible using the above-described system for software companies, such as games manufacturers, to provide with television adverts samples of the latest games software for review by potential customers before an order is placed. Placing bets, entering lotteries, etc., will also be possible by way of the combined media.

Figure 8:
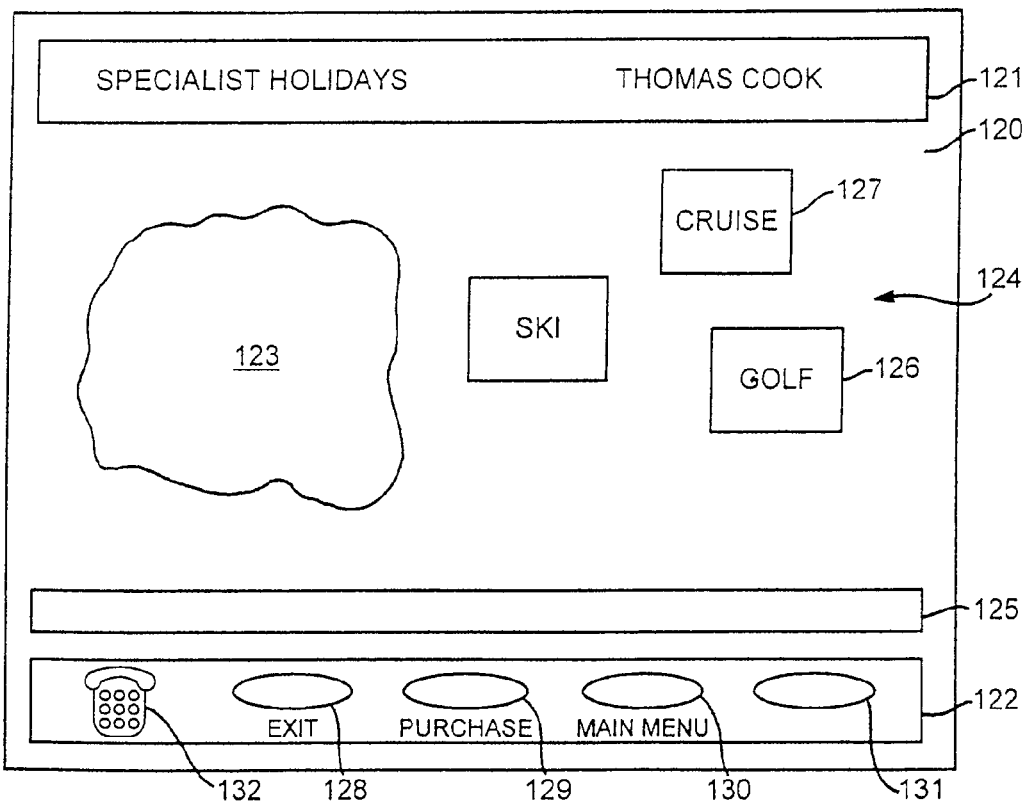
FIG. 8 is a diagram of a screen of a service provider.

In the above-described FIGS. 7, 8 and 11 the picture 113, 123, 174 is illustrated as occupying a bounded area that is distinct from the background in which the area is located. In general an interactive screen (such as shown in FIG. 7, 8 or 11) comprises at least some of the following components, namely: a background, one or more graphic overlays, one or more text overlays, one or more still/video pictures and accompanying audio. The components are transmitted individually in shared or separate channels, thereby providing both flexibility and consistency in the manner in which the interactive screens are formed and appear. Normally the background and the picture would be broadcast in a satellite channel and the graphic overlay would be received either from the satellite broadcast or on-line depending on the level of the interactive screen.

Figure 14:
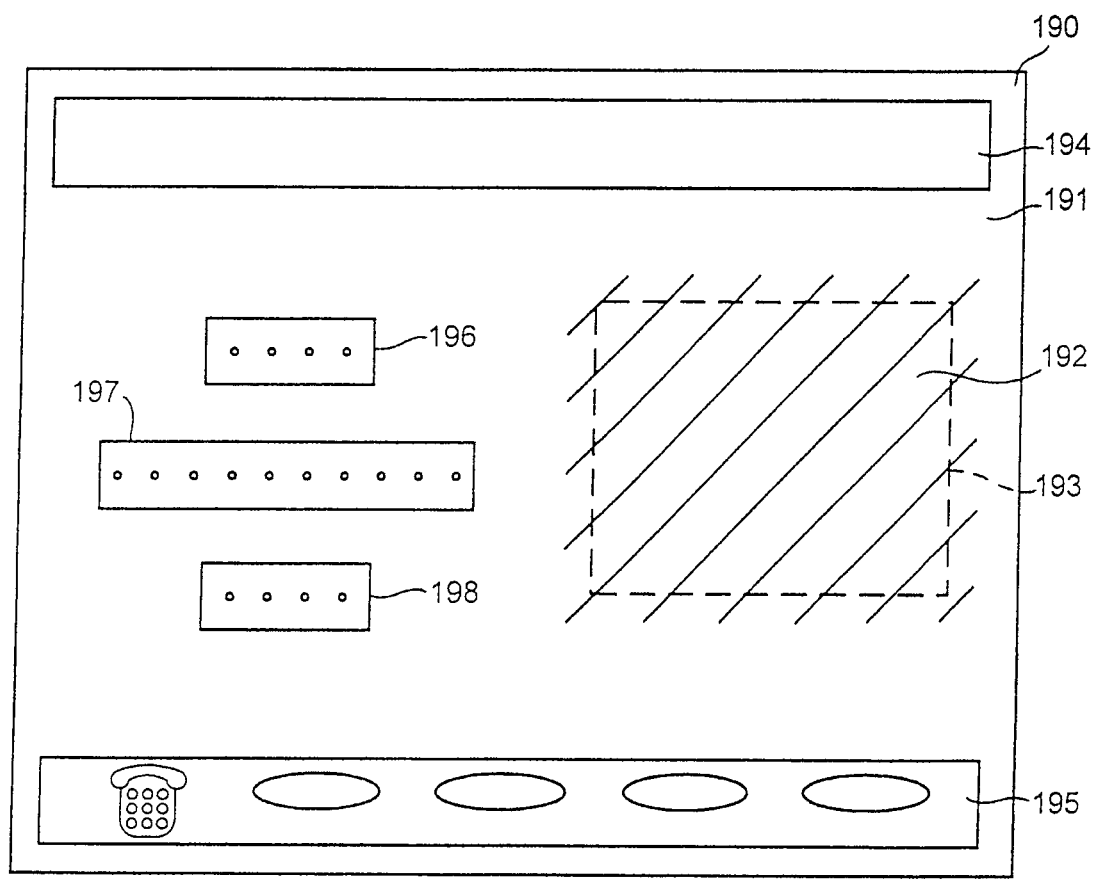
FIG. 14 is a diagram of another interactive screen.

It is possible to arrange the background, the graphic overlays and the picture so that the background appears to comprise the picture. FIG. 14 of the accompanying drawings shows an interactive screen 190, similar to the screen 170 of FIG. 11, in which the background 191 and the picture 192 are seamlessly integrated so that they appear to form a single picture. The picture 192 is shown bounded by the broken lines 193 merely for the purpose of illustration, the lines 193 would not appear in a real screen. By careful selection of the background image and the insert picture it is even possible to use video as the insert picture 192, although movement will, of course, only occur within the area surrounded by the broken lines 193.

Caution should be exercised when a graphic overlay is overlaid on the background. The graphic overlay simply replaces the background in the final interactive image. For example in FIG. 14 the graphic overlay comprises the header 194, the footer 195 and the interactive boxes 196 to 198. Large processing overheads would be necessary to determine which portions of the background image had been replaced in order to enable the background image to be reconstituted when the graphic overlay was changed. Such processing overheads are not commercially justifiable. However, the problem can be avoided in one of two ways. One way is to ensure that the form of each graphic overlay is the same so that one overlay will replace entirely the previous overlay. The other way is to arrange the graphic overlay so that it contains portions of the background image and to make the overall area occupied by the graphic overlay of uniform size as between one overlay and the next. Within the overall area the form of the graphic overlay can be changed as desired so that the viewer sees a sequence of graphic images of different shapes and sizes superimposed seamlessly onto the background. In other words, the graphic overlay can be designed, like the picture, to integrate seamlessly with the background.

In our co-pending Patent Application No. PCT/GB96/01228, the teachings of which are incorporated herein by reference, we describe the electronic program guide aspects of the decoder 3. In addition to the features described in our co-pending application, the decoder 3 may additionally provide such features as will now be described.

Figure 15:
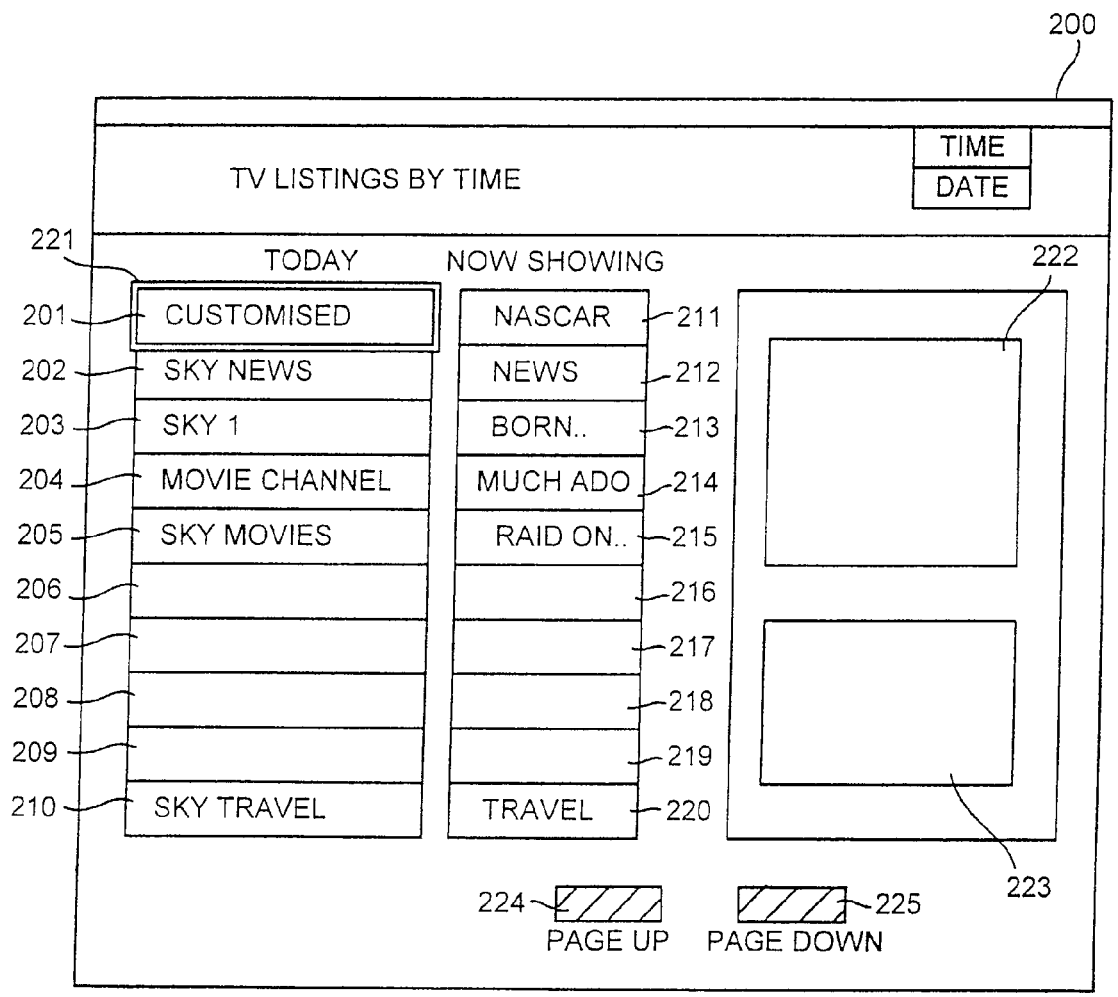
FIG. 15 is a diagram of a listings screen.

FIG. 15 of the accompanying drawings shows a TV Listings by Time Screen 200 selected interactively by the user manipulating the remote control unit 28 as described in detail in the above-mentioned pending application PCT/GB96/01228. The Listings by Time screen 200 provides the viewer with a list of programs currently showing on selected channels. With the screen 200 displayed the viewer is free to highlight anyone of the boxes 201 to 220 by manipulation of the up, down, left and right keys of the remote control unit 28. By way of example the "Movie Channel" box 204 has been selected is shown highlighted by a highlight 221 in FIG. 15.

If one of the boxes 211 to 220 representing a currently showing program is highlighted, manipulation of an appropriate selection key of the remote control unit 28 will be interpreted by the decoder as a command to display a preview of the program on the screen 200. The appropriate command may, for example, be manipulation of the "left" key on the remote control unit 28. In response to such a command the processor 23 causes the schedule grid to disappear leaving on the screen 200 only the list of channel names 201 to 210 with the currently selected channel name highlighted; causes a quarter screen video 222 of the current program of the selected channel to be displayed; causes audio for the program to be output; and causes extended information 223 relating to the program also to be displayed.

This function could be provided by transmitting the video information of each channel specially in reduced size. However, in order to save transmission bandwidth it is preferable that the decoder instead makes use of video data that is already being transmitted. Therefore, the decoder is arranged to tune to the selected channel and to scale down the normal transmission to quarter size. With the video inset 222 displayed, the viewer can use the Up and Down arrow keys (not shown) of the remote control unit 28 to scroll through the channel list in the normal manner, and view programs currently showing on other channels.

The screen 200 also includes "soft" Page Up and Page Down keys 224, 225 which can be selected by manipulation of a corresponding soft key of the remote control unit 28. The decoder is arranged so that if a subscriber selects either the Page Down or the Page Up soft key the highlight 221 is scrolled in the appropriate direction through the channel list automatically at five second intervals. The representation 224, 225 of the selected soft key is dimmed to indicate the scroll is in progress. Pressing any key of the remote control unit 28 stops the scroll and the action appropriate to that key is then taken by the decoder.

If a viewer is not a subscriber entitled to view the program showing on the currently highlighted channel then a graphic is displayed in place of the video inset 222.

To return to the normal functionality of the listings grid the viewer simply sends the appropriate command, for example by manipulating the "right" key (not shown) of the remote control unit 28. The video inset and program extended information then disappears and the grid is then re-displayed with the program name showing and the selected channel name highlighted.

Restricted access such as parental control is an important aspect of subscription television decoders. In hitherto known decoders restricted access has been by way of a PIN number which prevents viewing of a channel unless the correct PIN is entered. While this approach provides an acceptable degree of control, it nevertheless leaves visible details of the restricted channel. Greater control can be provided if, in addition, details of a restricted channel are removed from all normally accessed program guide listings.

Figure 16:
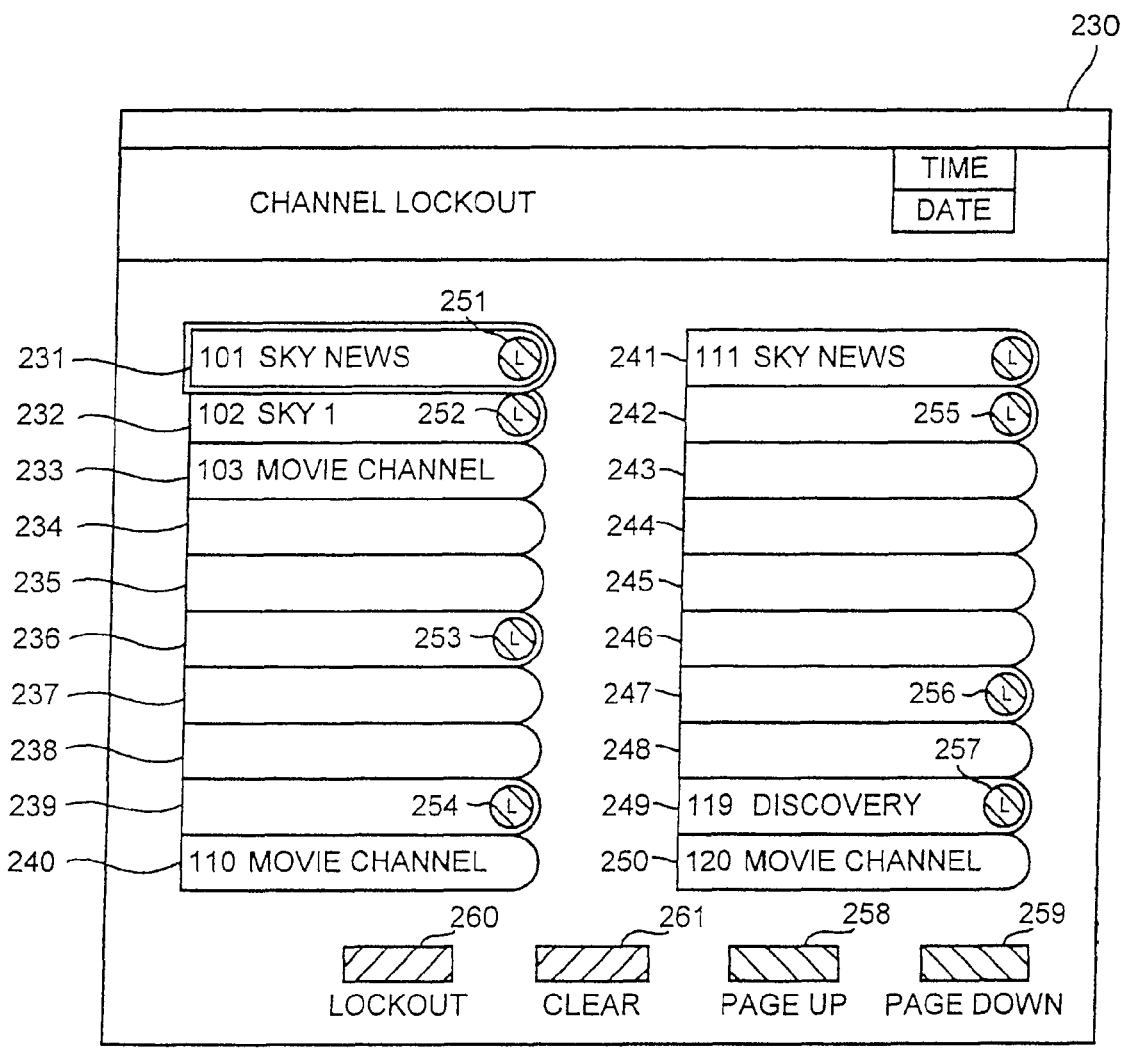
FIG. 16 is a diagram of a lockout screen.

The decoder 3 includes a Channel Lockout feature which is controlled by a Lockout Screen 230 such as shown in FIG. 16 of the accompanying drawings is shown when Channel Lockout is selected a scrollable list of channel information is displayed in the Lockout Screen 230. Each channel is identified by both number and name in a respective box 231 to 250 in the Lockout Screen 230. An indicator 251 to 257 is displayed in a box if the channel has been subjected to lockout.

On entry to the Lockout Screen 230 the first channel displayed (in box 231) is highlighted. The viewer may use Up and Down keys of the remote control unit 28 to scroll through the Channel Lockout list. The Lockout screen 230 also includes "soft" Page Up and Page Down keys 258, 259 which can be selected for the same purpose by manipulation of a corresponding soft key of the remote control unit 28.

A lockout indicator is only displayed for the channel when the channel is locked out. The viewer can enable a lockout on a channel by highlighting an unlocked channel and pressing the Lockout soft key 260. A lockout can be disabled by highlighting an unlocked channel and pressing a Clear soft key 261.

Data identifying channels which are locked out is stored in a non-volatile portion of the RAM 26 (see FIG. 2) so that the data is maintained if the set top box is powered off.

If a channel is locked out then: programs showing on the channel are not displayed in any of the EPG listings; the channel name is not displayed in any listings of channels; the channel is skipped when channel surfing. If a lockout on a channel is cleared, then the channel name and programs showing on the channel are re-included in the listings, and the channel is no longer skipped when channel surfing. Programs from this channel previously selected for future viewing must be manually re-added by the viewer. The viewer must also manually add the channel back into any favorite channel list.

Although any number of channels could, in theory, be locked out, it is believed that in practice no more than ten channels will be required to be locked out. The decoder 3 is therefore designed so that a maximum of ten channels can be locked out. If a viewer tries to lock out more than ten channels, then a text message "Only ten channels can be locked out—Press Back Up to continue" is displayed. If the viewer then presses the appropriate Back Up key of the remote control unit 28, the Channel Lockout screen 230 is again displayed. Further manipulation of the remote control unit keys will cause the decoder to display a Channel Description Screen for the highlighted channel. Pressing the Back Up key of the remote control unit 28 will cause the Channel Lockout screen 230 to be again displayed.

In normal use, if a viewer selects a channel, then, providing the channel is not locked out, the decoder will simply re-tune to the selected channel so that normal satellite TV viewing can commence. If the selected channel is locked out then a crash screen stating "This channel is lockout out" will be displayed.

Before decoders leave the factory they are pre-programmed with the channels in a given order. The order is determined by the television company, for example, or by other factors such as the order of satellite transponders assigned to the channels. The pre-programmed order may not correspond with the order desired by the viewer. For example one viewer may regard sports as having a high priority and wish to assign low numbers to the sports channels so that they are viewed first, say during channel "surfing". Other viewers may regard news and movie channels as being important and regard sports as a low priority. Currently available decoders allow channels to be reordered, but only by re-tuning to each channel in the desired order. This is a difficult and time-consuming process.

Figure 17:
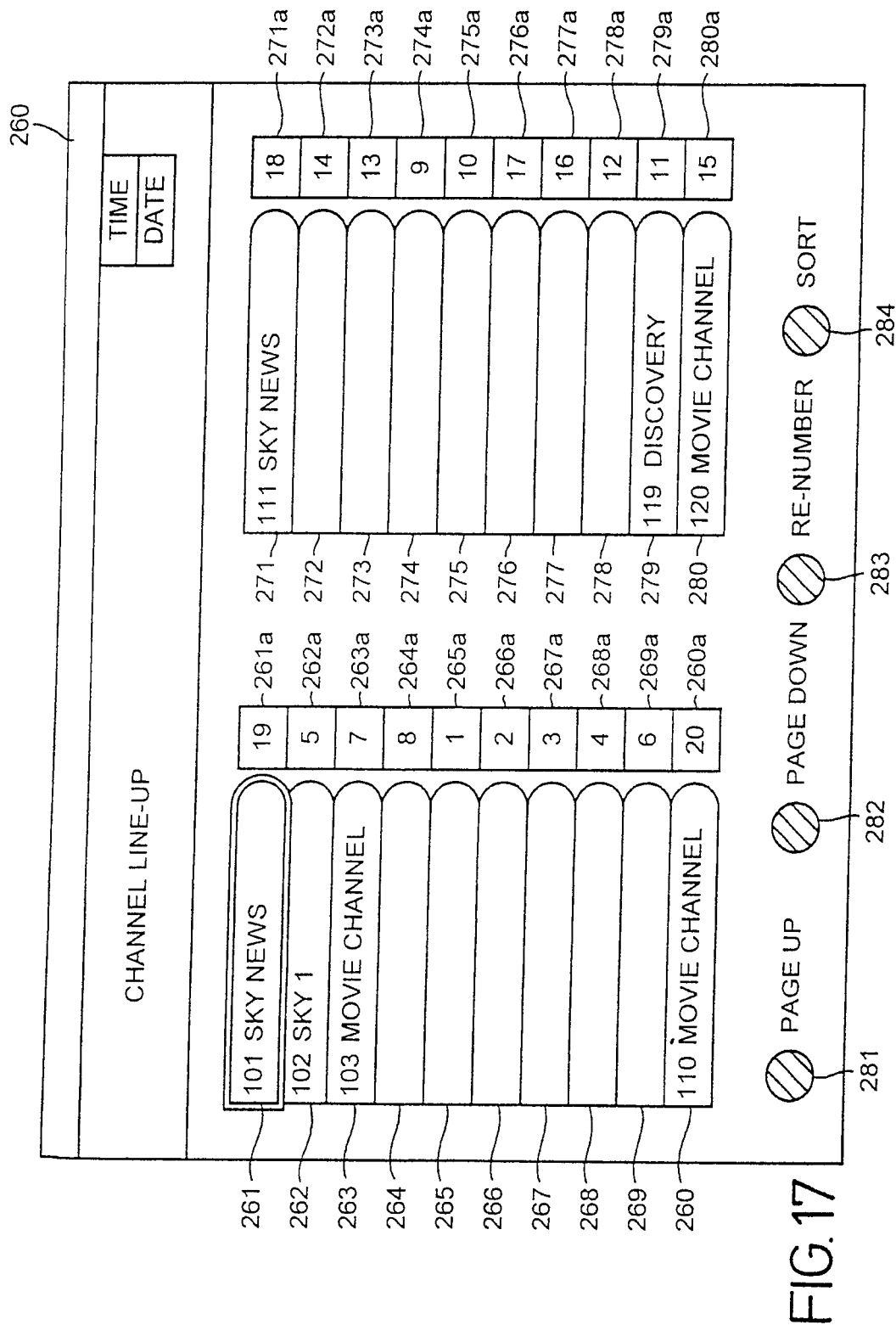
FIG. 17 is a diagram of a channel listings screen.

The decoder 3 is programmed to generate a Channel Line-Up screen 260 such as shown in FIG. 17 of the accompanying drawings. This screen 260 provides the viewer with a means for re-ordering the channels as they appear on other listing screens. The Channel Line-Up screen 260 comprises a scrollable list of channel information in the form of boxes 261 to 280 each representing a channel in terms of its number and name. An associated portion 261a to 280a for each box identifies the position in which the channel will appear in other listing screens.

On entry to the Line-Up screen 260 the first channel displayed 261 is highlighted. Viewer manipulation of Up and Down arrow keys of the remote control unit 28 and soft keys associated with Page Up and Page Down soft keys 281, 282 displayed on the screen 260 causes the highlight to scroll through the channel list in the normal manner.

The screen 260 also includes a Reorder soft key 283 which enables the order in which channels appear on the schedule grid to be modified as follows. On selecting the Reorder soft key 283 the preferred position box, say box 263a, of the selected channel, say box 263, is highlighted and cleared. The viewer is then prompted to enter the new position. Each numeric key press is displayed in the position entry box 263a to indicate that the key press was successful. A maximum of three numerals can be entered since it is believed unlikely that more than 1000 channels will be available to a given viewer. When the viewer presses the appropriate key on the remote control unit 28 the selected channel is allocated the position entered, and the channel previously occupying that position is allocated the old position of the selected channel. Thus channels may be swapped to obtain the preferred listing order. The position entry box can be cleared so that position entry can be restarted simply by manipulating an appropriate key of the remote control unit 28. Once the viewer is satisfied with the order of the channels, manipulating a select key (not shown) of the remote-control unit 28 is interpreted as a command to return to other listing screens where the channels will be listed in their desired positions. Channels that have not been allocated a preferred position are listed in channel number order after those which have been allocated a preferred position.

In addition a viewer can see the effect of the ordering on the Channel Line-Up screen 260 itself A Sort soft key 284 is provided and causes the channel list to be displayed in the desired order. If channels are re-ordered whilst being displayed by selected order the channels names will swap position in the list automatically. In other words, the decoder 3 is arranged to respond to the Sort soft key 284 as if it were a toggle so that selecting the Sort soft key 284 a second time causes the channels to be redisplayed by channel number. If a subscriber presses the Select key (not shown) of the remote control and then the decoder 3 will respond by returning to the highlighted channel so that normal satellite TV viewing can commence.

Having thus described the present invention by reference to a preferred embodiment it is to be well understood that the embodiment in question is exemplary only and that modifications and variations such as will occur to those possessed of appropriate knowledge and skills may be made without departure from the spirit and scope of the invention as set forth in the appended claims and equivalents thereof.

What is claimed is:

1. A receiver for receiving television signals in a plurality of channels, and programme scheduling data defining the scheduling of programmes in the plurality of channels, the receiver being arranged to produce from the received programme scheduling data output signals defining for display an image of a list of at least one of the plurality of channels and a list of current programmes currently showing in said at least one of the plurality of channels, the receiver comprising a user operable selector operable to:
   a. receive a first user input to highlight a current programme from the list of current programmes and being responsive to the first user input to highlight the current programme without tuning to the channel associated with the highlighted current programme; and b. receive a second user input to select the highlighted current programme from the list when displayed and being responsive to the second user input to cause the receiver to:
   i. tune to the channel associated with the selected highlighted current programme;
   ii. receive video data for the selected highlighted current programme; and
   iii. combine the video data with the output signals so that the output signals define an image of the selected highlighted current programme in combination with the image of the list of the current programmes.

2. The receiver of claim 1, wherein the user operable selector is operable to highlight any one of the current programmes from the list.

3. The receiver of claim 2, wherein the user operable selector is operable to scroll through the displayed list to highlight any one of the current programmes from the list.

4. The receiver of claim 1, arranged to display extended information relating to the selected highlighted current programme, in combination with the image of the list and the video data for the selected highlighted current programme.

5. The receiver of claim 1, arranged to receive the video data for the selected highlighted current programme by receiving said video data transmitted in reduced size.

6. The receiver of claim 1, arranged to receive said video data and to scale down the received data for display.

7. The receiver of claim 1, arranged to display an alternate image if the subscriber is not entitled to view the selected highlighted current programme.

8. The receiver of claim 1, arranged to display a list of said plurality of channels in combination with the image of the selected highlighted current programme and the image of the list of current programmes.

9. A method of operating a television receiver, comprising:
a. receiving television signals in a plurality of channels;
b. receiving programme scheduling data defining the scheduling of programmes in the plurality of channels;
c. producing from received programme scheduling data output signals defining for display an image of a list of at least one of a received plurality of channels and a list of current programmes currently showing in said at least one of the received plurality of channels;
d. providing a user operable selector operable to:
   i. receive a first user input to highlight a current programme from the list of current programmes;
   ii. respond to the first user input by highlighting the current programme without tuning to the channel associated with the highlighted current programme;
   iii. receive a second user input to select the highlighted current programme from the list when displayed; and
   iv. respond to the second user input by causing the receiver to:
   tune to the channel associated with the selected highlighted current programme;
   receive video data for the selected highlighted current programme; and
   combine the video data with the output signals so that the output signals define an image of the selected highlighted current programme in combination with the image of the list of the current programmes.

10. The method of claim 9, wherein the user operable selector is operable to highlight any one of the current programmes from the list.

11. The method of claim 10, the user operable selector is operable to scroll through the displayed list to highlight any one of the current programmes from the list.

12. The method of claim 9, including displaying extended information relating to the selected highlighted current programme, in combination with the image of the list and the video data for the selected highlighted current programme.

13. The method of claim 9, including receiving the video data for the selected highlighted current programme by receiving said video data transmitted in reduced size.

14. The method of claim 9, including receiving said video data and scaling down the received data for display.

15. The method of claim 9, including displaying an alternate image if the subscriber is not entitled to view the selected highlighted current programme.

16. The method of claim 9, including displaying a list of said plurality of channels in combination with the image of the selected highlighted current programme and the image of the list of current programmes.

17. A computer program stored on a non-transitory computer-readable medium, comprising program code arranged to:
a. receive television signals in a plurality of channels;
b. receive programme scheduling data defining the scheduling of programmes in the plurality of channels;
c. produce from received programme scheduling data output signals defining for display an image of a list of at least one of a received plurality of channels and a list of current programmes currently showing in said at least one of the received plurality of channels;
d. provide a user operable selector operable to:
   i. receive a first user input to highlight a current programme from the list of current programmes;
   ii. respond to the first user input by highlighting the current programme without tuning to the channel associated with the highlighted current programme;
   iii. receive a second user input to select the highlighted current programme from the list when displayed; and
   iv. respond to the second user input by:
   tuning to the channel associated with the selected highlighted current programme;
   receiving the video data for the selected highlighted current programme; and
   combining the video data with the output signals so that the output signals define an image of the selected highlighted current programme in combination with the image of the list of the current programmes;
c. to highlight the current programme without tuning to the channel associated with the highlighted current programme; and
d. receive a second user input to select the highlighted current programme from the list when displayed and being responsive to the second user input to cause the receiver to:
   i. tune to the channel associated with the selected highlighted current programme;
   ii. receive video data for the selected highlighted current programme; and
   iii. combine the video data with the output signals so that the output signals define an image of the selected highlighted current programme in combination with the image of the list of the current programmes.

* * * * *